June 30, 1931.	M. E. STREEPY	1,812,568
TIRE CHAIN
Original Filed April 5, 1928
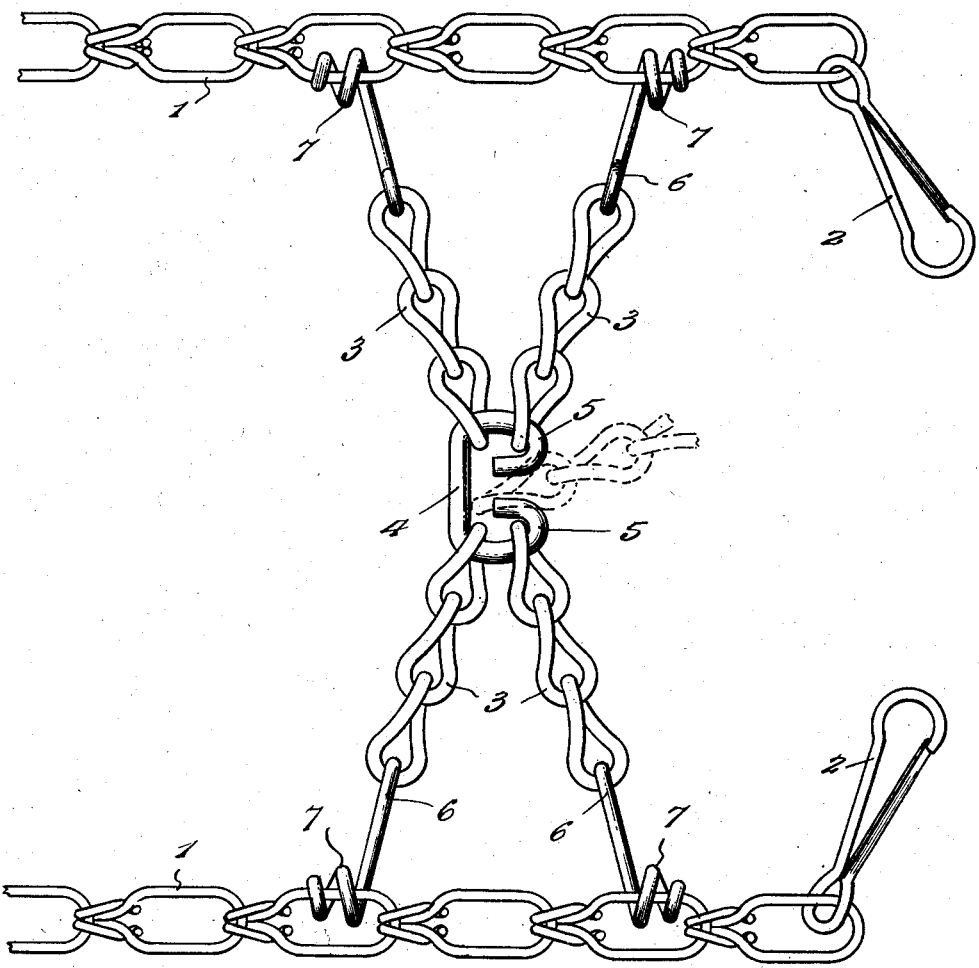
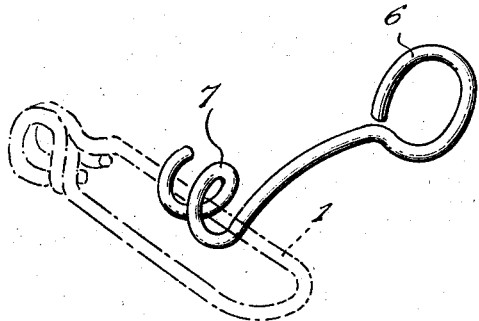
Inventor
M. E. Streepy.
By Lacey & Lacey, Attorneys Patented June 30, 1931

1,812,568

UNITED STATES PATENT OFFICE

MILTON E. STREEPY, OF ALTOONA, PENNSYLVANIA

TIRE CHAIN

Application filed April 5, 1928, Serial No. 267,731. Renewed November 21, 1930.

This invention relates to anti-skid chains for soft tread, or pneumatic tires.

The invention provides for a quick release of the cross chains and ready replacement thereof as occasion may require, without necessitating the use of cutting pliers, chisel or other type of tool.

In accordance with the invention the cross chain includes two like sections, a B link connecting the sections and an attaching link of peculiar formation at the outer end of each of the sections for connecting it to the side chain, the outer link being of the type including a bar terminating in an attaching pig tail.

While the drawings illustrate a preferred embodiment of the invention it is to be understood that in adapting the means to meet specific needs and requirements the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a detail plan view of an end portion of a tire chain embodying the invention, the dotted lines indicating the manner of disconnecting or applying the section of a cross chain to the B-link.

Figure 2 is a perspective view of the link at the outer ends of a cross chain.

Corresponding and like parts are referred to in the following description and designated in the views of the drawing by like reference characters.

The numeral 1 denotes the side chains or members of an anti-skid chain. Each of the side chains or members 1 is provided at one end with a snap-hook 2 for connecting the ends of the chain after the same has been fitted about a tire.

The members 1 are connected by pairs of cross chains which are arranged to present the outline of the letter X. Each of the cross chains of a tire comprises sections 3 which are connected at their inner ends by a B-link and which are provided at their outer ends with a link of the form substantially as illustrated in Figure 2 of the drawings. The B-link includes a straight side 4 and loops 5 which have their adjacent ends spaced apart to admit of a link of the cross chains passing therebetween. The inner ends of the loops 5 are spaced from the straight side 4 of the link to admit of a link of a cross chain passing between the straight side 4 and the terminal of a loop 5. In this manner provision is had for ready detachment of a section of a cross chain from the B-link or attachment of the said section thereto. Thus, a broken or worn chain may be easily and quickly replaced without the use of any tools. Moreover, the B-link is adapted to lie flat against the outer side of the tire at a medial point which coincides with the intersection of the cross chains.

The link at the outer end of each of the sections 3 of a cross chain consists of a bar having an eye 6 at one end and a pig tail 7 at the opposite end which admits of a positive connection being maintained with the side chains, yet providing for ready detachment and attachment of the cross chains as occasion may require. Thus casual disengagement of the cross chains from the side chains is prevented, at the same time admitting of ready separation of the parts by proper manipulation, so that a worn or broken part may be easily and quickly replaced.

The arrangement provides for replacement of any one of the sections 3, without necessitating the substitution of a cross chain when it is required only to replace an end portion which frequently happens.

Having thus described the invention, I claim:

1. An anti-skid device comprising side chains, pairs of short chains arranged in X formation between the side chains, a B link engaged by and connecting the inner converging ends of the pairs of chains and having terminals normally preventing disengagement of said chains, and links detachably connecting the outer diverging ends of the short cross chains with the side chains.

2. An anti-skid device comprising side chains, pairs of short chains arranged in X formation between the side chains, a single transverse link detachably connecting the inner converging ends of the pairs of short cross chains and having inturned terminals normally preventing release of said chains, and links detachably connecting the outer ends of the short cross chains with the side chains, each of said links consisting of a bar having an eye at one end engaging the terminal link of a short chain and a pig tail at the opposite end to detachably engage a link of a side chain.

In testimony whereof I affix my signature.

MILTON E. STREEPY. [L. S.]